Fig. 4

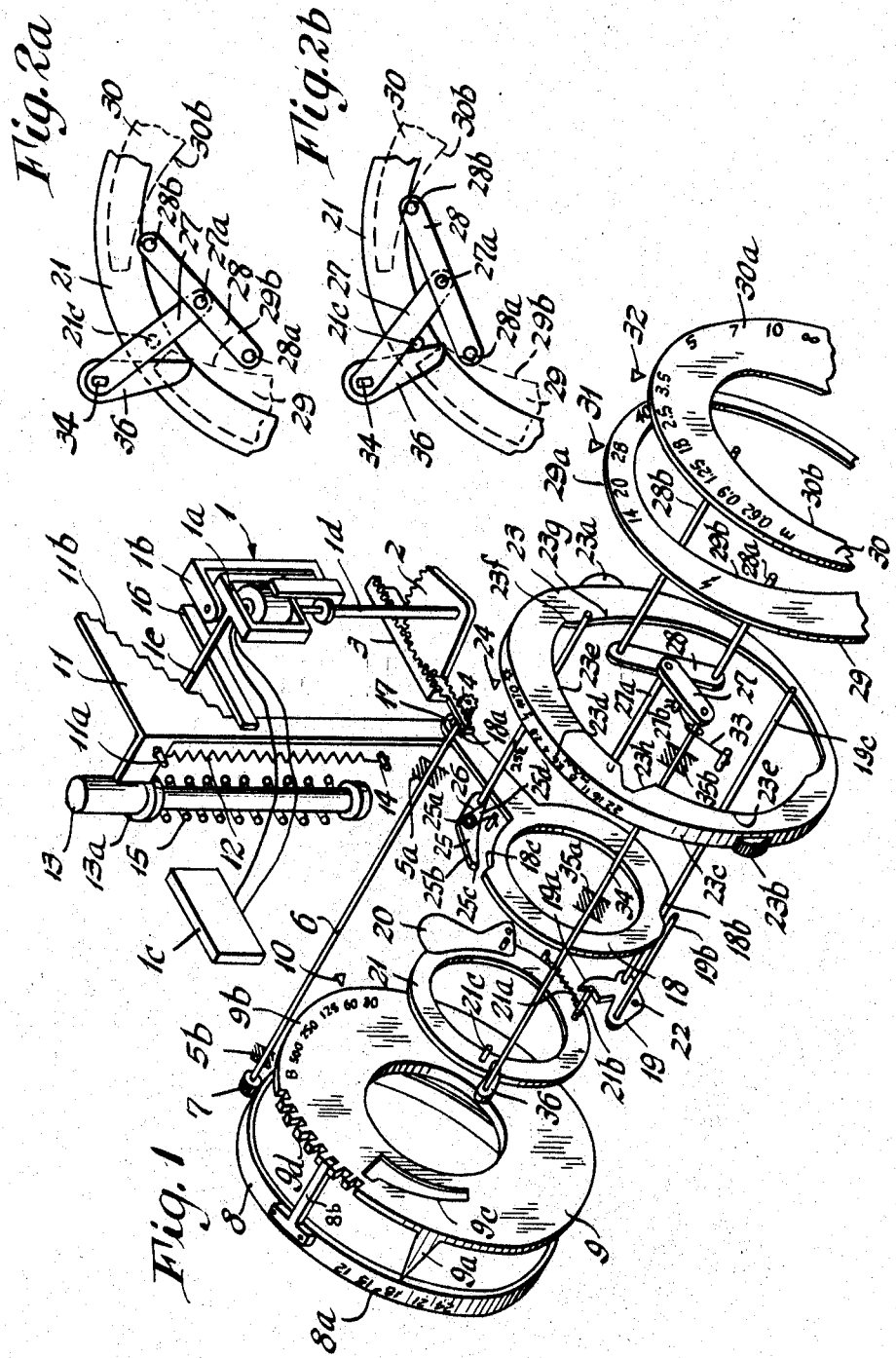

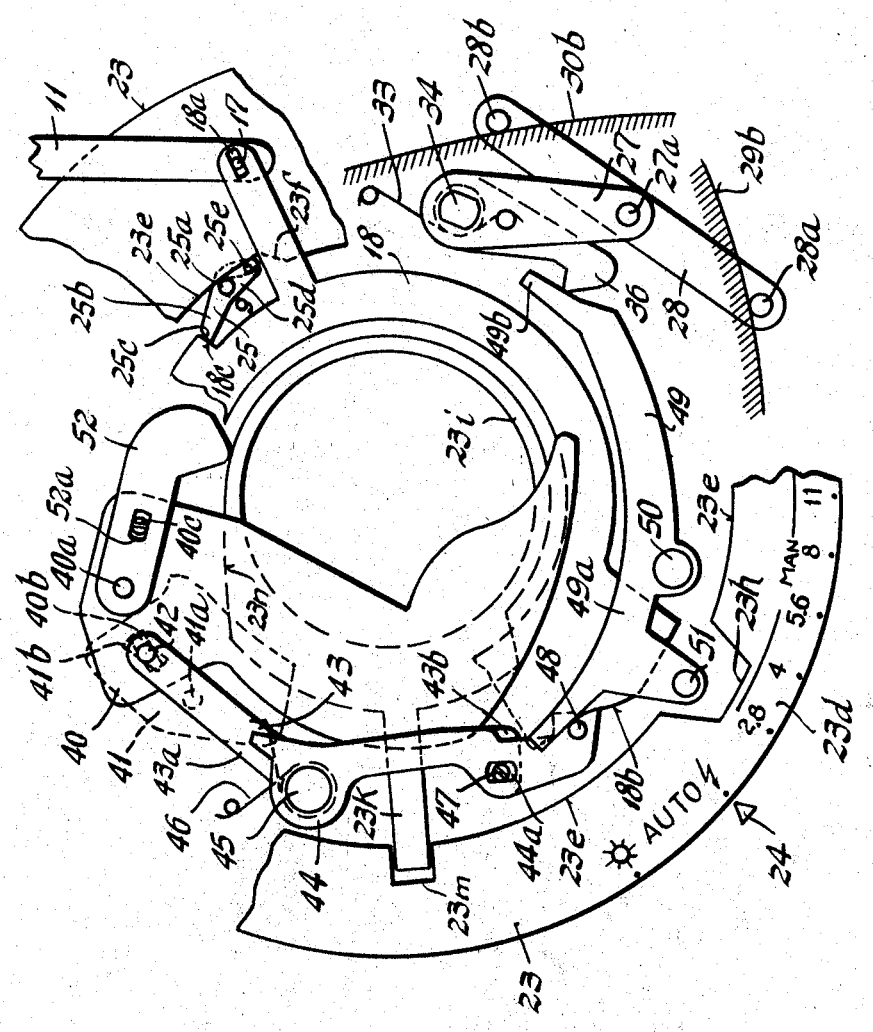

INVENTOR.
Waldemar T. Rentschler
BY
Arthur A. March
ATTORNEY

United States Patent Office 3,322,051
Patented May 30, 1967

3,322,051
PHOTOGRAPHIC CAMERA WITH BUILT-IN OR ATTACHED EXPOSURE METER AND A MANUAL OR AUTOMATICALLY ADJUSTABLE DIAPHRAGM
Waldemar T. Rentschler, Calmbach (Enz), Germany, assignor to Alfred Gauthier, G.m.b.H., Calmbach (Enz), Germany, a corporation of Germany
Filed July 24, 1964, Ser. No. 384,908
Claims priority, application Germany, July 27, 1963, G 38,326
3 Claims. (Cl. 95—10)

The invention relates to photographic cameras of the type containing built-in or attached exposure meters and manual or automatically adjustable diaphragms effecting variable aperture sizes, with respect to either daylight or photoflash use.

In the past, it has been proposed to construct cameras employing a plurality of operating positions or ranges whose controls, designed to be switched from one range to the other, were also used for the setting of the guide number values in the flash range of the camera. However, cameras operated in this manner had the disadvantage that a change in operating range cancelled the previous setting of the guide number value so that it became necessary, prior to effecting a "photoflash" exposure to reset the guide number value, a step easily forgotten.

Cameras were also constructed in such a manner as to use a separate guide number control designed to take into account the guide number of the type of flashbulb used. These guide number controls were coupled to the distance controls in relative positions. Such coupling required the use of a linearized scale on the distance controls, thus necessitating an increased expenditure of complicated structural members in order to correlate the lens assembly adjustments to the coupled distance and guide number controls.

The above described disadvantage and drawback of this type of camera is obviated by the present invention, one object of which is to provide a novel and improved photographic camera of the kind outlined above, which is so organized and arranged that a special control is incorporated for taking the guide number value into consideration in such a manner as to dispense with additional complicated means designed to synchronize the lens assembly and distance controls.

The present invention accomplishes this and solves the problem by a novel arrangement whereby the diaphragm is actuated, in the "photoflash" range of the camera, by a differential mechanism which is operatively connected to the guide number and distance control. In addition, thru the appropriate development of a control cam used for feeding the distance values into the differential mechanism, the adaptation of the setting characteristic of the distance control to the setting characteristic of the guide number control can be effected in a substantially simpler and less expensive manner.

Another object of this invention is to save expenditure by operatively connecting the differential mechanism with a lever which acts directly on the ring used for actuating the diaphragm.

A further object of the invention is to provide a modification thereof whereby the differential is operatively connected to a catch lever which is designed to engage a stepped cam affixed to a setting ring, the ring becoming operative only in the "photoflash" range of the camera.

Details of the invention will become apparent from the specification which follows and from the accompanying drawing, which illustrates the several embodiments and applications of the subject matter of the invention, and in which:

FIG. 1 shows a perspective, exploded view of one embodiment of the subject matter of the invention.

FIG. 2a shows a diagrammatic front elevational view, on an enlarged scale, of the differential designed for the automatic setting of the diaphragm in the "photoflash" range of the camera. The illustration depicts the position taken by differential when the camera has been set for any range other than "Automatic Photoflash."

FIG. 2b is a view similar to that of FIG. 2a, except the position illustrated is that taken by the differential when the camera has been set at "Automatic Photoflash."

FIG. 3 is a diagrammatic front elevational view of a photographic intra-lens shutter construction as located at the front of a camera, constituting another embodiment of the invention. Arranged in the shutter construction is a device designed for automatically setting the diaphragm in the photoflash range of the camera, such device differing from that illustrated in FIG. 1.

FIG. 4 shows a perspective exploded view of a further embodiment of the invention with components stretched out in the direction of the optical axis of the shutter. Arranged in the construction is a device designed for automatically setting the diaphragm in either range of the camera to effect a change in aperture size only when the shutter release trigger is actuated.

Referring first to FIG. 1, a photo-electric exposure meter 1 includes a rotating coil 1a positioned in a U-shaped carrier 1b and fed by the current of a photocell 1c. Affixed to one end of the U-shaped carrier 1b is a shaft 1d which is arranged co-axially with the movable coil 1a, and which rotates within a fixed bearing sleeve not shown in the drawing. Rigidly attached to the free end of the shaft 1d is a toothed segment 2 which meshes with a rack 3. The latter in turn meshes with a pinion 4, the pinion being affixed to one end of a shaft 6 which is rotatably positioned in two bushings 5a and 5b. Rigidly attached to the free end of shaft 6 is another pinion 7 that engages a film sensitivity control 8 arranged co-axially with the axis of the objective lens. A rotation of the control 8 will thus effect a change in the basic position of the U-shaped carrier 1b for the purpose of taking into consideration different film sensitivities according to a film sensitivity scale 8a which is arranged on the control 8 and which cooperates with a relatively fixed mark 9a. The mark 9a may be arranged on the exposure time, or shutter speed, control 9, which in turn may be provided with an exposure time scale 9b that cooperates with a fixed mark 10. A cam 9c is provided to control an escapement mechanism, which may be of any suitable form. The exposure time control 9 and the film sensitivity control 8 are coupled together through the cooperation of a pin 8b and notches 9d located on the controls 8 and 9, respectively. Such detent is releasable for the purpose of setting the film sensitivity.

A shutter release trigger 13 is located in a camera housing not shown for reasons of clarity and is pressed upwardly by a spring 15. For automatic exposure setting, a sensing member 11 engages a flange 13a on the shutter release trigger 13 to move therewith so as to sense, in a manner known per se, the position of the movable coil 1a of the exposure meter 1.

The sensing member 11 is pulled downwardly by a tension spring 12, one end of which is hooked onto a fixed pin 14, and the other end of which is hooked into a pin 11a of the sensing member 11. The tension spring 12 is weaker than the spring 15, so that the sensing member 11 occupies the starting position shown in the drawing when the shutter release is not actuated. For the purpose of cooperation with the rotating coil 1a of the exposure meter, the sensing member 11 has a stepped cam 11b, the steps of which are pulled into engagement with a needle 1e of the rotating coil 1a by the force of the tension spring 12 upon depression of the shutter release 13.

For the purpose of effecting exposures with automatic diaphragm setting, a setting ring 18 is provided, which is arranged co-axially with the axis of the objective, and has a slot 18a that fits over a pin 17 on the sensing member 11. The ring 18 is provided with control cam 18b which controls the operation of a diaphragm actuating ring 21. The setting ring 18 is linked to the diaphragm actuating ring 21 by three-armed lever 19 which is pivotally mounted on a fixed axle 22. The pin 21b of the diaphragm actuating ring 21 is pulled against one lever arm 19a by the spring 21a. The other arms of the three-armed lever 19 carry pins 19b and 19c, which serve, respectively, as cam followers for the control cam 18b of the setting ring 18 and a cam 23g on a diaphragm aperture control 23. The latter is arranged co-axially with the controls 8 and 9 for film sensitivity and exposure time, and is provided with finger-pieces 23a and 23b. The control 23 has a diaphragm scale 23d which is positioned by reference to a mark 24. The manual setting range defined by the diaphragm scale 23d and located on the surface area 23c of the aperture control 23, within which the diaphragm actuating ring 21 is governed by means of the control cam 23g, is followed by a flash symbol indicating the "Automatic Photoflash" range of the camera, which symbol in turn is followed by a sun symbol indicating the "Automatic Daylight" range of the camera. The "AUTO" designation simply means that the aperture width is adjusted automatically whenever the camera is set at one of the above-mentioned symbols.

As is apparent from the drawing, an arresting lever 25 biased by a spring 26 and pivotally mounted on a fixed pin 25a is associated wth the setting ring 18. The purpose of this arresting lever is to retain the ring 18 as well as the sensing member 11 in a starting position when the diaphragm aperture control 23 is set to its manualy controlled range of positions, thereby keeping the sensing member 11 from controlling the diaphragm actuating ring 21. In order to lock the ring 18 against movement, the arm 25b of the lever 25 engages a projection 18c when a pin 25e, which extends from the other arm 25d, engages section 23e of the inner circumference of the diaphragm setting control 23. When the diaphragm aperture control 23 is set at the "Flash" symbol, the pin 25e remains in contact with section 23e of the inner circumference of said control 23, thus effectively locking the ring 18, as above. However, at the "sun" symbol setting position of the setting member 23, the peak of the cam 23f is opposite the pin 25e, which keeps the arresting lever 25 rotated clockwise against spring action as shown in the drawing, thus leaving the setting control ring 18 freely rotatably. But if the control 23 is moved clockwise to the range of the diaphragm scale 23d, the pin 25e reaches the range of the radially lower region 23e. The resulting pivoting motion of the lever 25 moves the arm 25b into the path of motion of the projection 18c of the setting ring 18 and locks the latter against clockwise motion. The setting of the diaphragm lamellae 20 is now determined by the cam 23g which is linked to the diaphragm actuating ring 21 by way of the pin 19c and the lever 19. If the control 23 had been moved clockwise from the "sun" position to the "flash" position, the above would be true, except that the setting of the diaphragm lamellae 20 would be determined by the differential arrangement shown in FIGS. 2a and 2b.

With respect to the differential shown in FIGS. 1–2b, the invention provides for a coupling consisting of an epicyclic train used to connect two levers 27 and 28 at the pivot point provided by pin 27a, thus permitting independent curvilinear motion. Attached to the free ends of lever 28 are pins 28a and 28b. These pins in turn engage, respectively, under the pressure of the spring 33, sections 29b and 30b of the inner circumferences of the controls 29 and 30, as shown in FIGS. 1–2b.

Rigidly attached to the free end of the lever 27 is a shaft 34, which is rotatably positioned in fixed bushings 35a and 35b. The free end of shaft 34 is rigidly connected to another lever 36 which, due to the biasing effect of spring 21a on the diaphragm actuating ring 21, is forced about against a pin 21c affixed to the ring 21, when the diaphragm aperture control ring 23 is set at the "photoflash" position. This arrangement is illustrated in FIG. 2b.

A rotation of either or both of the control rings 29 and 30, when the camera is set at the "photoflash" position of ring 23, will thus effect a change in the position of the diaphragm actuating ring 21 through the differential mechanism, according to the setting of the scale 29a and 30a with respect to fixed marks 31 and 32. The scales 29a and 30a are located, respectively, on the guide number control ring 29 and distance or focus control ring 30.

It is apparent from the drawing in FIG. 1 that the control cam 23e, comprising the inner circumference of the diaphragm aperture control 23, contains a recessed portion 23h. This portion 23h is fixed in such a position that the pivot point pin 27a of the differential mechanism, dips into the recessed portion 23h when the control ring 23 is set at the "photoflash" position. This permits the pins 28a and 28b to engage, respectively, control cams 29b and 30b of the control rings 29 and 30. Thus a method is provided for disconnecting the differential mechanism when the camera is set at any position other than "Automatic Photoflash." As the control ring 23 is moved in either a clockwise or counterclockwise direction from the "photoflash" position, the pin 27a slides out of the recess 23h and onto the inner circumference control cam 23e. This lifts the pins 28a and 28b, respectively, off cams 29b and 30b of control rings 29 and 30 into the position shown in FIG. 2a, thus disconnecting the differential mechanism. It is apparent that when the differential mechanism has been disconnected, the diaphragm actuating ring 21 is no longer influenced by the lever 36.

The mode of operation of the camera, according to the invention as illustrated in FIGS. 1–2b, is the following:

*Automatic daylight*

For automatic daylight operation, the diaphragm aperture control ring 23 is set with the "sun" symbol opposite the mark 24. If, in this position of the camera, the shutter release 13 is depressed in order to take a photograph, the sensing member 11 follows, due to the action of the spring 12, until one of its steps 11b impinges on the needle 1e of the coil 1a. In response to this motion of the sensing member, the setting ring 18 is also simultaneously rotated in clockwise direction. This, in turn, causes the diaphram setting cam 18b also to become operative and forces the pin 19b to push the lever 19 which, in turn, moves the diaphragm actuating ring 21 and the diaphragm lamellae 20 into a position corresponding to the distance traveled by the ring 18. This completes the automatic exposure setting. When pressure on the shutter release 13 is removed, the above-mentioned parts return to their starting position associated with the largest diaphragm aperture.

*Automatic photoflash setting*

Upon clockwise rotation of the diaphragm aperture control ring 23 to the "photoflash" position indicated on the ring 23, the pin 25e, attached to the lever 25, engages section 23e of the inner circumference of the control 23, thus effectively locking the ring 18 through the counterclockwise rotation of the lever 25, as described hereinbefore. Simultaneously, pin 27a of the differential mechanism engages the recessed portion 23h of the section 23e, thus causing pins 28a and 28b to engage sections 29b and 30b, respectively, of the inner circumference of each of the control rings 29 and 30. The lever 36 cooperating with the pin 21c of the diaphragm actuating ring 21, and controlled by the particular setting of the guide number and distance control rings, is now in complete control of the diaphragm setting, as illustrated in FIG. 2b. Assuming a specific distance setting, it is apparent from the drawings that, upon counterclockwise rotation of the guide number control ring 29, the pin 28a slides along section 29b of the inner circumference of said ring 29, thereby moving away from the axis of the objective lens. Such motion causes lever 28 to execute a clockwise rotation, thereby imparting a counterclockwise rotation to lever 27 which, in turn, through lever 36, effects a clockwise rotation of the diaphragm actuating ring 21, thereby closing the diaphragm lamellae 20.

Conversely, if a specific guide number value is assumed as a constant, and if the distance control ring 30 is rotated in a clockwise direction, the pin 28b slides along section 30b of the inner circumference of said ring 30 thereby moving away from the axis of the objective lens so that the diaphragm lamellae are set at a smaller aperture width as hereinbefore described.

Manual setting of the diaphragm

In order to effect exposures with manual setting of the diaphragm aperture size, it is merely necessary to rotate the diaphragm aperture control 23 clockwise from the "Automatic Photoflash" position until the desired diaphragm value of the scale 23d is opposite the fixed mark 24. During this setting process, the pin 27a of the differential mechanism moves out of the recessed portion 23h of section 23e of the inner circumference of said control ring 23. Such motion of pin 27a disengages the differential mechanism, and more particularly, the pins 28a and 28b from the control rings 29 and 30. The pin 25e remains in contact with control cam 23e and thus the lever 25 continues to engage the ring 18, thus preventing rotation of this ring. Upon rotation of the diaphragm control 23, the cam 23g also becomes operative, being linked by the pin 19c and the lever 19 to the diaphragm actuating ring 21 so as to move the latter into a position corresponding to the diaphragm aperture that has been set.

The modification of the invention, as illustrated in FIG. 3, relates to a camera arrangement whose lens diaphragm comprises two lamellae 40 and 41, rotatably positioned on fixed pins 40a and 41a, respectively. A two-armed lever 43 and a lever 44 are employed to connect the lamellae to the setting ring 18, which is influenced by sensing member 11. The levers 43 and 44 are rotatably positioned on a fixed pin 45 and are biased by a spring 46. The arms 43a and 43b of the lever 43 carry pins 42 and 47, respectively. Pin 42 engages slots 40b and 41b of diaphragm lamellae 40 and 41, and pin 47 engages slot 44a of the lever 44, thereby establishing the operative connection between the levers 43 and 44. Integrally attached to one end of lever 44 is a pin 48 which is so positioned as to contact the cam 18b of the setting ring 18, as illustrated in FIG. 3. Thus, a clockwise rotation of the ring 18 effects an identical rotation of the connected levers 43 and 44, thereby causing the lamellae 40 and 41 to move from a position of largest diaphragm aperture to smaller and smaller apertures.

Coordinated with the lever pair 43 and 44 is another two-armed lever 49 rotatably attached to a fixed pin 50. One arm 49a of the lever 49 abuts against the pin 48 of the lever 44, while the other arm of lever 49 is engaged by the lever 36 of the differential mechanism hereinbefore described. The differential lever 36 is biased by the spring 33, the tension of which is stronger than that of spring 46 acting on the pair of levers 43 and 44. In addition, the arm 49a of lever 49 carries a pin 51 which is placed where it can engage the recessed portion 23h of the surface 23e of the inner circumference of the diaphragm aperture control ring 23.

For the purpose of setting the diaphragm in the manual setting range, the invention according to FIG. 3 provides for an additional ring 23i which is non-rotatably connected to the control ring 23 through the engagement of an arm 23k with a recess 23m on the inner circumference of said control ring 23. The ring 23i has a control cam 23n which is engaged by a sensing member 52 rotatably arranged on the pin 40a of the diaphragm lamella 40. The sensing member 52 contains a slot 52a which is engaged by a pin 40c of the lamella 40, the pin/slot connection thus providing the operative connection between the sensing member 52 and the lamella 40.

The operation of the above-described arrangement is basically identical with that of the embodiment according to FIG. 1. When the "Automatic Photoflash" position is set, as shown in FIG. 3 pin 51 of the arm 49a engages the recessed portion 23h of the control ring 23. This causes the arm 49a to abut against pin 48 of the lever 44. Since the setting ring 18 is locked in place by the lever 25, as hereinbefore described, the setting of the diaphragm lamellae 40 and 41 is effected by means of the differential mechanism 27, 28, 34 and 36, which is controlled by the guide number and distance control rings 29 and 30 according to FIG. 1. The influence on the diaphragm lamellae is transmitted from the control rings 29 and 30 through the differential mechanism and lever 36, to the levers 49, 44 and 43. Thus, a clockwise rotation imparted to lever 36 causes a counterclockwise rotation of lever 49 which, in turn, imparts a clockwise rotation to the lever combination 44 and 43, thus closing the diaphragm lamellae.

Upon counterclockwise rotation of the diaphragm aperture control ring 23 from the position shown in FIG. 3 to the "Automatic Daylight" position, the pin 51 attached to lever 49 slides out of the recess 23h and onto the surface 23e of the inner circumference of said ring 23. The arm 49a is thus disengaged from pin 48 of lever 44, allowing the pin 48 to contact the cam 18b of the setting ring 18. In addition, a counterclockwise rotation is imparted to the lever 36 of the differential mechanism, causing the pins 28b and 28a to be lifted off the control ring cams 30b and 29b, respectively, into the position shown in FIG. 2a. The lever 25 releases the control ring 18 in the same manner as hereinbefore explained in connection with FIG. 1, and the sensing member 52 remains in contact with the uncammed portion of ring 23i, thus uninfluential with respect to diaphragm lamellae.

It is thus apparent from the drawing that the setting ring 18 controlled by the exposure meter 1 is now in control of the diaphragm aperture setting, in that the cam 18b operates through the pin 48 on the levers 44 and 43, which in turn control the motion of the lamellae as hereinbefore described.

Upon clockwise rotation of the diaphragm aperture control ring 23 from the position shown in FIG. 3 to the "MAN" position associated with scale 23d, the pin 51 slides out of the recess 23h onto the control cam 23e of the control ring 23, thus releasing the differential mechanism and disengaging the levers 49 and 44 as described above. The lever 25 is moved so as to lock the setting ring 18 in place, as hereinbefore described. The clockwise rotation of the ring 23 imparts a clockwise rotation to the ring 23i through the arm 23k which is engaged in the slot 23m in the inner circumference of the control ring 23. The control cam 23n is thus moved into a controlling position with respect to the sensing member 52, which in turn controls the diaphragm lamellae 40 and 41.

The modification of the invention illustrated in FIG. 4 relates to a camera arrangement wherein the diaphragm actuating ring 21 closes the aperture to its preset value only when the shutter release trigger 13 is actuated. In this embodiment of the invention a control ring 53 is provided whose mode of operation is similar to that of the setting ring 18′, the former becoming operative when the camera is set for "Automatic Photoflash" the latter operative when the setting is for "Automatic Daylight." An angular slide member 54, biased by a spring 56, is arranged to be moved parallel to the shutter release trigger 13 in order to control the movement of the ring 53 and is attached thereto through the engagement of the pin 55 with slot 53a. The free end of the angular member 54 is pressed against the collar flange 13a of the shutter release trigger 13 by the spring 56, the tension of, even when combined with that of spring 12, is weaker than the compression spring 15 associated with the shutter release trigger 13. Thus the members 11 and 54 will remain in their starting positions until the trigger 13 is actuated.

Affixed to the ring 53 is a stepped cam 53b, designed to cooperate with a catch lever 36′ rigidly attached to the shaft 34 of the differential mechanism previously described. The ring 53 is also provided with a control cam 53c which controls the operation of the diaphragm actuating ring 21 through the pin 19d and lever 19′, when the camera is in the "Automatic Photoflash" position. The pin 19d cooperates with the cam 18b′ of the setting ring 18′ when the camera is in the "Automatic Daylight" position, and with the cam 23g′ of the diaphragm aperture control ring 23′ when the camera is set in the "MAN" range.

It is apparent from the drawing that spring-biased arresting levers 25′ and 57 rigidly mounted on a common shaft 58 are associated, respectively, with rings 18′ and 53. These levers carry a common sensing pin 59 which is adapted to cooperate with the surfaces 23e′, 23f′, and 23p′ of the inner circumference of the diaphragm aperture control ring 23′. In addition, the free ends of each of the levers 25′ and 57 carry, respectively, pins 25b′ and 57c. Pin 25b′ is designed to cooperate with the stop edge 18c′ and the slot-shaped opening 18d′ of the ring 18′, while the pin 57c is designed to engage either of two stop edges 53d and 53e as well as the slot 53f of the ring 53.

In operation, if the diaphragm aperture control ring 23′ is set to the "Automatic Daylight" position as illustrated in FIG. 4, the sensing pin 59 of the levers 25′ and 57 engages the surface 23p′ of the inner circumference of the control ring 23′. The lever 25′ is thus set in such a position as to free the ring 18′, while the lever 57 is positioned such that its pin 57c engages the stop surface 53d, thus locking the ring 53 in position. Upon release of the shutter release 13, the diaphragm lamellae will be set by means of the ring 18′ and its cam 18b′ in a manner hereinbefore described in connection with FIG. 1.

Upon resetting of the control ring 23′ to the "Automatic Photoflash" position, the sensing pin 59 slips onto the surface 23f′ of the inner circumference of said ring 23′, causing the pin 57c to be placed opposite the opening 53f of ring 53 while the pin 25b′ engages the stop edge 18c′ of ring 18′, thus locking said ring 18′ in position. The pin 27a of the differential mechanism engages the recess 23h′ of the surface 23e′, thus causing the pins 28a and 28b to engage the surfaces 29b and 30b of the control rings 29 and 30. Thus the lever 36′ can be set in a position corresponding to a particular setting of the guide number and distance control rings. Upon actuation of the shutter release 13, the diaphragm lamellae will be set by means of the ring 53 and its cam 53c. The final position of the lamellae will be realized when the stepped cam 53b of said ring 53 impinges on the preset catch lever 36′, thereby terminating its rotary motion.

Upon setting of the control ring 23′ to the "MAN" position, the sensing pin 59 is moved onto the surface 23e′ of the inner circumference of the ring 23′, which causes the pin 57c to engage the stop edge 53e of the ring 53, thus locking this ring in position, while the pin 25b′ is placed opposite the slot 18d′ in the ring 18′. In addition, a short circuit switch 60 arranged in the circuit of the exposure meter 1 is closed by means of a control edge 23g of the control ring 23′, so that the rotating coil 1a of the exposure meter 1 is no longer supplied with current. The needle 1e of the coil 1a is thus pivoted to a position that precludes its making contact with the stepped cam 11b of the sensing member 11. The sensing pin 19b affixed to the lever 19′ comes into the region of the control cam 23g′ which is located in the diaphragm aperture control ring 23′ and is associated with the scale 23d on the control ring 23′. Actuation of the shutter release 13 will bring about setting of the diaphragm lamellae by means of the ring 18′ and its cam 18b′ acting on the sensing pin 19d of the lever 19′. The rotation of the ring 18′ will continue until the pin 19d engages the cam 23g′ of the control ring 23′.

It will be understood that while the invention has been described in specific detail, variations and modifications may be made without departing from the scope of the invention as determined by the following claims.

What is claimed is:

1. A photographic camera comprising an exposure meter; a variable diaphragm capable of being set at different diaphragm aperture sizes; a diaphragm setting device controlling said diaphragm; a setting member having an "Automatic Daylight" setting position, an "Automatic Photoflash" position, and a "Manual" setting range; a guide number setting control for adjusting the operation of the camera according to flashbulb guide numbers; a focusing control; a ring connected to said exposure meter to be controlled thereby; means controlled by said setting member to connect said ring to said diaphragm setting device when said setting member is in its "Automatic Daylight" position whereby the aperture of said diaphragm will be automatically controlled in accordance with light reaching said exposure meter; a differential mechanism connected to said focusing control and to said guide number setting control to be operated by settings of both of said last-named controls, said differential mechanism having means governed by said setting member to render said differential mechanism operable when said setting member is set to its "Automatic Photoflash" position; and means connecting said differential mechanism to said diaphragm setting device to control the operation thereof only when said setting member is set to its "Automatic Photoflash" position, whereby aperture size of said diaphragm will then be governed by said guide number setting control and said focusing control.

2. The photographic camera of claim 2 in which said means connecting said differential mechanism to said diaphragm setting device comprises a lever directly connected to and actuating said diaphragm setting device.

3. The photographic camera of claim 1 comprising a second setting member, means connected to said first setting member and to said second setting member to permit said second setting member to be operative only when said first setting member is in its "Automatic Photoflash" position; a stepped cam on said second setting member; a catch lever connected to said differential mechanism to be controlled thereby to engage the steps on said stepped cam; and means connecting said second setting member to said diaphragm setting device to control said diaphragm.

References Cited

UNITED STATES PATENTS

| | | | |
|---|---|---|---|
| 3,118,356 | 1/1964 | Sauer | 95—64 |
| 3,134,315 | 5/1964 | Koppen | 95—10 X |
| 3,169,464 | 2/1965 | Koppen | 95—64 |
| 3,198,096 | 8/1965 | Koppen | 95—64 |
| 3,199,425 | 8/1965 | Starp | 95—64 |
| 3,220,325 | 11/1965 | Macomber | 95—10 |

NORTON ANSHER, *Primary Examiner.*

C. B. PRICE, J. F. PETERS, *Assistant Examiners.*